US009239439B2

(12) United States Patent
Ko et al.

(10) Patent No.: US 9,239,439 B2
(45) Date of Patent: *Jan. 19, 2016

(54) OPTICAL AND ELECTRICAL CONNECTOR

(71) Applicant: Intel Corporation, Santa Clara, CA (US)

(72) Inventors: Jamyuen Ko, San Jose, CA (US); Hengju Cheng, Mountain View, CA (US); Tom Mader, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/066,607

(22) Filed: Oct. 29, 2013

(65) Prior Publication Data
US 2014/0133811 A1 May 15, 2014

Related U.S. Application Data

(63) Continuation of application No. 13/758,271, filed on Feb. 4, 2013, now Pat. No. 8,613,561, which is a continuation of application No. 11/731,810, filed on Mar. 30, 2007, now Pat. No. 8,398,314.

(51) Int. Cl.
*G02B 6/42* (2006.01)
*G02B 6/38* (2006.01)
*H01R 13/717* (2006.01)

(52) U.S. Cl.
CPC .......... *G02B 6/4204* (2013.01); *G02B 6/3817* (2013.01); *G02B 6/4284* (2013.01); *G02B 6/3853* (2013.01); *G02B 6/3885* (2013.01); *H01R 13/7172* (2013.01); *Y10T 29/49208* (2015.01)

(58) Field of Classification Search
CPC .. G02B 6/3817; G02B 6/3853; G02B 6/3885; G02B 6/4204; G02B 6/4284
See application file for complete search history.

(56) References Cited

U.S. PATENT DOCUMENTS 4,082,421 A * 4/1978 Auracher et al. ............... 385/66
4,781,431 A 11/1988 Wesson et al.
5,109,452 A 4/1992 Selvin et al.
(Continued)

FOREIGN PATENT DOCUMENTS

CN 87216477 U 8/1988
CN 87216477 8/1998
(Continued)

OTHER PUBLICATIONS

PCT Int'l Search Report and Written Opinion for Int'l Application No. PCT/US2009/058304 mailed Apr. 30, 2010, 11 pages.
(Continued)

*Primary Examiner* — Rhonda Peace
(74) *Attorney, Agent, or Firm* — Vincent Anderson Law PC

(57) ABSTRACT

Embodiments of the invention are directed to an optical USB (OUSB) to enhance the data rate of USB by adding superhigh data rate (e.g. 10 Gbps) optical communication on top of its current specification so that backward compatibility is achievable. Mechanical tolerances may be achieved by using embedded lenses to expand a beam emerging from the connector prior to entering its mating connector and using an identical lens in the mating connector to collimate the beam back onto a fiber.

24 Claims, 3 Drawing Sheets

(56) References Cited

U.S. PATENT DOCUMENTS

| | | | |
|---|---|---|---|
| 5,241,612 A | 8/1993 | Iwama | |
| 5,242,315 A | 9/1993 | O'Dea | |
| 5,515,467 A * | 5/1996 | Webb | 385/88 |
| 6,179,627 B1 * | 1/2001 | Daly et al. | 439/76.1 |
| 6,302,591 B1 * | 10/2001 | Nagaoka et al. | 385/59 |
| 6,478,625 B2 * | 11/2002 | Tolmie et al. | 439/607.06 |
| 6,584,519 B1 | 6/2003 | Russell | |
| 6,739,766 B2 | 5/2004 | Xu et al. | |
| 6,755,575 B2 | 6/2004 | Kronlund et al. | |
| 6,964,578 B2 | 11/2005 | Clark et al. | |
| 6,981,887 B1 | 1/2006 | Mese et al. | |
| 7,160,032 B2 * | 1/2007 | Nagashima et al. | 385/75 |
| 7,182,646 B1 | 2/2007 | Chou et al. | |
| 7,347,632 B2 | 3/2008 | Farr | |
| 7,354,205 B2 * | 4/2008 | Sakata et al. | 385/92 |
| 7,374,349 B2 | 5/2008 | Wang | |
| 7,458,732 B2 * | 12/2008 | Harano et al. | 385/92 |
| 7,572,071 B1 | 8/2009 | Wu | |
| 7,614,802 B2 * | 11/2009 | Morioka | 385/93 |
| 7,717,733 B1 | 5/2010 | Yi et al. | |
| 7,798,726 B2 | 9/2010 | Sabo | |
| 7,815,469 B1 * | 10/2010 | Nguyen et al. | 439/607.35 |
| 7,887,243 B2 | 2/2011 | Abel et al. | |
| 7,896,559 B2 | 3/2011 | Yi et al. | |
| 7,985,026 B1 | 7/2011 | Lin et al. | |
| 8,061,905 B2 * | 11/2011 | Ma et al. | 385/75 |
| 8,118,497 B2 * | 2/2012 | Yi | 385/93 |
| 8,251,593 B2 | 8/2012 | Liao | |
| 8,262,296 B2 | 9/2012 | Liao et al. | |
| 8,388,241 B2 * | 3/2013 | He et al. | 385/92 |
| 8,398,314 B2 | 3/2013 | Ko et al. | |
| 8,403,568 B2 | 3/2013 | Wang et al. | |
| 8,498,508 B2 * | 7/2013 | Lin | 385/43 |
| 8,554,030 B2 * | 10/2013 | Noguchi | 385/33 |
| 8,613,561 B2 * | 12/2013 | Ko et al. | 385/93 |
| 8,651,749 B2 * | 2/2014 | Dainese Júnior et al. | 385/74 |
| 8,678,672 B2 * | 3/2014 | Wu | 385/88 |
| 8,702,319 B2 * | 4/2014 | Wu | 385/75 |
| 8,702,325 B2 * | 4/2014 | Wu | 385/93 |
| 8,905,653 B2 * | 12/2014 | Wu | 385/93 |
| 2002/0004336 A1 | 1/2002 | Yamaguchi | |
| 2002/0006748 A1 | 1/2002 | Tolmie et al. | |
| 2002/0102066 A1 | 8/2002 | Nishita | |
| 2003/0053766 A1 * | 3/2003 | Cheng et al. | 385/89 |
| 2003/0053767 A1 * | 3/2003 | Cheng et al. | 385/89 |
| 2003/0133687 A1 | 7/2003 | Han et al. | |
| 2003/0229749 A1 * | 12/2003 | Saito et al. | 710/305 |
| 2004/0042735 A1 | 3/2004 | Ma | |
| 2004/0105629 A1 * | 6/2004 | Cheng et al. | 385/89 |
| 2004/0105630 A1 * | 6/2004 | Cheng et al. | 385/89 |
| 2004/0105631 A1 * | 6/2004 | Cheng et al. | 385/89 |
| 2004/0153595 A1 * | 8/2004 | Sukegawa et al. | 710/305 |
| 2004/0184738 A1 | 9/2004 | McColloch et al. | |
| 2005/0180700 A1 | 8/2005 | Farr | |
| 2006/0056779 A1 | 3/2006 | Wang | |
| 2006/0088251 A1 * | 4/2006 | Wang et al. | 385/88 |
| 2006/0263012 A1 | 11/2006 | Yamazaki | |
| 2007/0049119 A1 * | 3/2007 | Fujimoto et al. | 439/610 |
| 2007/0105452 A1 * | 5/2007 | Gerlach et al. | 439/676 |
| 2007/0122156 A1 | 5/2007 | Wang et al. | |
| 2008/0320200 A1 | 12/2008 | Pederson et al. | |
| 2009/0154877 A1 * | 6/2009 | Morioka | 385/39 |
| 2009/0154878 A1 * | 6/2009 | Noguchi | 385/39 |
| 2009/0154884 A1 | 6/2009 | Chen et al. | |
| 2009/0274422 A1 | 11/2009 | Henry et al. | |
| 2009/0324176 A1 | 12/2009 | Cheng et al. | |
| 2010/0046891 A1 | 2/2010 | Sabo | |
| 2010/0080519 A1 | 4/2010 | Ko et al. | |
| 2010/0104244 A1 | 4/2010 | Grinderslev | |
| 2010/0124845 A1 * | 5/2010 | Sabo et al. | 439/607.01 |
| 2010/0158448 A1 * | 6/2010 | Yi et al. | 385/74 |
| 2010/0226612 A1 | 9/2010 | Sedio et al. | |
| 2010/0278490 A1 | 11/2010 | Liao et al. | |
| 2010/0290745 A1 | 11/2010 | Liao et al. | |
| 2010/0303420 A1 | 12/2010 | Lin et al. | |
| 2011/0026885 A1 * | 2/2011 | Lin | 385/77 |
| 2011/0033155 A1 * | 2/2011 | Daikuhara | 385/72 |
| 2011/0085766 A1 | 4/2011 | Liao et al. | |
| 2011/0091160 A1 | 4/2011 | He et al. | |
| 2011/0091161 A1 | 4/2011 | He et al. | |
| 2011/0091162 A1 | 4/2011 | He et al. | |
| 2011/0097040 A1 | 4/2011 | Lin et al. | |
| 2011/0097041 A1 | 4/2011 | Liao et al. | |
| 2011/0097042 A1 | 4/2011 | Liao et al. | |
| 2011/0097043 A1 | 4/2011 | He et al. | |
| 2011/0142401 A1 | 6/2011 | Lin et al. | |
| 2011/0194823 A1 * | 8/2011 | Wu | 385/92 |
| 2011/0255825 A1 * | 10/2011 | Ko et al. | 385/15 |
| 2011/0299816 A1 | 12/2011 | Yen et al. | |
| 2012/0002930 A1 * | 1/2012 | Lin et al. | 385/101 |
| 2012/0020629 A1 * | 1/2012 | Shiratori et al. | 385/93 |
| 2012/0039574 A1 * | 2/2012 | Liao et al. | 385/93 |
| 2012/0045180 A1 * | 2/2012 | Lin et al. | 385/89 |
| 2012/0213477 A1 * | 8/2012 | He et al. | 385/58 |
| 2012/0213482 A1 * | 8/2012 | Su et al. | 385/93 |
| 2013/0142486 A1 * | 6/2013 | Wu | 385/59 |
| 2013/0148930 A1 * | 6/2013 | Ko et al. | 385/88 |
| 2013/0272666 A1 * | 10/2013 | Qi et al. | 385/93 |
| 2014/0133811 A1 * | 5/2014 | Ko et al. | 385/93 |

FOREIGN PATENT DOCUMENTS

| | | |
|---|---|---|
| CN | 2475175 | 1/2002 |
| CN | 2475175 Y | 1/2002 |
| DE | 3831322 | 8/1990 |
| DE | 19733648 | 6/1999 |
| EP | 0114230 | 8/1984 |
| JP | 64-54406 | 3/1989 |
| JP | 64-54406 A | 3/1989 |
| JP | 04-340508 | 11/1992 |
| JP | H04-340508 A | 11/1992 |
| JP | 05-113519 | 5/1993 |
| JP | 11-202166 | 7/1999 |
| JP | 2001-167837 | 6/2001 |
| JP | 2001-167837 A | 6/2001 |
| JP | 2002-050978 | 2/2002 |
| JP | 2002050978 | 2/2002 |
| JP | 2002-117948 A | 4/2002 |
| JP | 2002117948 | 4/2002 |
| JP | 2002-190344 A | 7/2002 |
| JP | 2002-190344 A | 7/2002 |
| JP | 2002190344 | 7/2002 |
| JP | 2003-107277 A | 4/2003 |
| JP | 2003-107277 | 9/2003 |
| JP | 2004-253456 | 9/2004 |
| JP | 2006-50292 | 2/2006 |
| JP | 2006-319836 | 11/2006 |
| KR | 10-2006-0054914 | 5/2004 |
| KR | 10-2006-0054914 A | 5/2006 |
| KR | 10-2008-003095 A | 4/2008 |
| KR | 10-2008-0030951 | 4/2008 |
| KR | 10-2008-009141 A | 10/2008 |
| KR | 20080091414 | 10/2008 |
| TW | M304153 | 1/2007 |
| TW | M304153 U | 1/2007 |
| TW | M341336 | 9/2008 |
| TW | M341336 U | 9/2008 |
| WO | WO-2006007421 | 1/2006 |
| WO | WO-2006077961 | 7/2006 |
| WO | 2007/033042 A2 | 3/2007 |
| WO | WO-2007033042 | 3/2007 |
| WO | 2008/121731 A1 | 10/2008 |
| WO | WO-2008121731 | 10/2008 |

OTHER PUBLICATIONS

Office Action from Japanese Patent Application No. 2009-552939, mailed Aug. 23, 2011, 3 pages.
Notice of Allowance for Korean Patent Application No. 2009-7020350, issued Nov. 29, 2011, 3 pages.
Office Action for Korean Patent Application No. 2009-7020350, mailed Feb. 10, 2011, 4 pages.
Notice of Allowance from GB Patent Application No. GB0915900.5, mailed Apr. 15, 2011, 1 page.

(56) References Cited

OTHER PUBLICATIONS

Search Report/Written Opinion: International Search Report and Written Opinion from PCT/US2008/058496 mailed Aug. 18, 2008, 9 pages.
International Preliminary Report on Patentability from PCT/US2008/058496 mailed Oct. 15, 2009, 5 pages.
Office Action for Chinese Patent Application No. 200810100363.7, mailed Mar. 11, 2010, 5 pages.
Notice of Allowance for Chinese Patent Application No. 200810100363.7, mailed Nov. 15, 2010, 4 pages.
Office Action for Taiwan Patent Application No. 97111354, mailed Aug. 12, 2011, 4 pages.
Office Action from U.S. Appl. No. 11/731,810 mailed Sep. 13, 2011, 10 pages.
Final Office Action for U.S. Appl. No. 12/242,311, mailed Nov. 28, 2011, 12 pages.
Office Action for U.S. Appl. No. 12/242,311, mailed Dec. 21, 2010, 9 pages.
Office Action for U.S. Appl. No. 12/242,311, mailed May 25, 2011, 10 pages.
International Search Report & Written Opinion for PCT Application No. PCT/US2009/057598, mailed Jun. 11, 2010, 12 pages.
Office Action from Korean Application No. 10-2011-7007290 mailed Apr. 25, 2012, 9 pages.
International Preliminary Report on Patentability & Written Opinion for PCT Application No. PCT/US2009/057598, mailed Mar. 20, 2012, 8 pages.
Notice of Allowance from U.S. Appl. No. 11/731,810 mailed Apr. 30, 2012, 12 pages.
International Preliminary Report on Patentability from PCT/US2009/057598 mailed Mar. 29, 2012, 8 pages.
International Search Report and Written Opinion from PCT/US2011/052657 mailed Apr. 26, 2012, 12 pages.
International Preliminary Report and Written Opinion from PCT/US2009/058304 mailed Apr. 14, 2011, 6 pages.
Office Action from U.S. Appl. No. 12/242,311 mailed Mar. 20, 2012, 14 pages.
Office Action from Taiwanese (R.O.C) Application No. 98132907 mailed Jul. 25, 2012, 5 pages.
Final Office Action from Korean Application No. 10-2011-7007290 mailed Aug. 13, 2012, 2 pages.
Office Action from Korean Application No. 10-2011-7007290 mailed Sep. 28, 2012, 4 pages.
Final Office Action for U.S. Appl. No. 12/242,311, mailed Oct. 2, 2012, 16 pages.
Notice of Allowance from U.S. Appl. No. 11/731,810 mailed Nov. 2, 2012, 10 pages.
Restriction Requirement from U.S. Appl. No. 12/887,325 mailed Nov. 14, 2012, 7 pages.
Office Action from U.S. Appl. No. 12/887,325 mailed Jan. 8, 2013, 12 pages.
Office Action from Chinese Application No. 200980137745.X mailed Feb. 5, 2013, 5 pages.
International Preliminary Report on Patentability and Written Opinion from PCT/US2011/052657 mailed Apr. 4, 2013, 10 pages.
Office Action from U.S. Appl. No. 13/758,271 mailed Apr. 12, 2013, 12 pages.
Notice of Allowance from U.S. Appl. No. 12/887,325 mailed Jun. 17, 2013, 10 pages.
Office Action for U.S. Appl. No. 12/242,311, mailed Jul. 31, 2013, 20 pages.
Office Action from Japanese Application No. 2012-529726 mailed Jul. 30, 2013, 4 pages.
Office Action from German Application No. 11 2008 000780.2-34 mailed Jul. 26, 2013, 4 pages.
Notice of Allowance for U.S. Appl. No. 13/758,271, mailed Aug. 19, 2013, 14 pages.
International Search Report and Written Opinion received for PCT Patent Application No. PCT/US2009/058304, mailed on Apr. 30, 2010, 11 pages.

Office Action Received for U.S. Appl. No. 12/242,311, mailed on Nov. 28, 2011, 11 pages.
Office Action Received for U.S. Appl. No. 12/242,311, mailed on Dec. 21, 2010, 9 pages.
Office Action Received for U.S. Appl. No. 12/242,311, mailed on May 25, 2011, 10 pages.
International Search Report and Written Opinion received for PCT Patent Application No. PCT/US2009/057598, mailed on Jun. 11, 2010, 12 pages.
International Preliminary Report on Patentability received for PCT Patent Application No. PCT/US2009/057598, mailed on Mar. 29, 2012, 8 pages.
International Preliminary Report on Patentability received for PCT Patent Application No. PCT/US2009/058304, mailed on Apr. 14, 2011, 7 pages.
Office Action Received for U.S. Appl. No. 12/242,311, mailed on Mar. 20, 2011, 14 pages.
Office Action Received for Japanese Patent Application No. 2009-552939, mailed on Aug. 23, 2011, 3 Pages of Japanese Office Action and 3 Pages of English Translation.
Notice of Allowance Received for Korean Patent Application No. 10-2009-7020350 mailed on Feb. 10, 2011, 2 pages of Notice of Allowance and 1 pages of English Translation.
Office Action Received for Korean Patent Application No. 10-2009-7020350 mailed on Feb. 10, 2011, 3 pages of English Translation only.
Notice of Allowance received for Great Britain Patent Application No. GB0915900.5, mailed on Apr. 15, 2011, 1 page.
International Search Report and Written Opinion received for PCT Patent Application No. PCT/US08/058496, mailed on Aug. 18, 2008, 9 pages.
International Preliminary Report on Patentability received for PCT Patent Application No. PCT/US08/058496, mailed on Oct. 15, 2009, 5 pages.
Office Action Received for Chinese Patent Application No. 200810100363.7, mailed on Mar. 11, 2010, 3 Pages of Chinese Office Action and 3 Pages of English Translation.
Notice of Allowance Received for Chinese Patent Application No. 200810100363.7, mailed on Nov. 15, 2010, 2 Pages of Chinese Office Action and 2 Pages of English Translation.
Office Action Received for U.S. Appl. No. 11/731,810, mailed on Sep. 13, 2011, 12 pages.
Office Action Received for Korean Patent Application No. 10-2011-7007290 mailed on Apr. 25, 2010, 4 pages of Office Action and 3 pages of English Translation.
Notice of Allowance Received for U.S. Appl. No. 11/731,810, mailed on Apr. 30, 2012, 12 pages.
International Search Report and Written Opinion received for PCT Patent Application No. PCT/US2011/052657, mailed on Apr. 26, 2012, 12 pages.
Office Action Received for Taiwanese Patent Application No. 098132907, mailed on Jun. 26, 2012, 6 Pages of Taiwanese Office Action and 1 Page of Translated Search Copy only.
Office Action Received for Korean Patent Application No. 10-2011-7007290 mailed on Aug. 13, 2012, 3 pages of Office Action and 2 pages of English Translation.
Office Action Received for Korean Patent Application No. 10-2011-7007290 mailed on Sep. 28, 2012, 5 pages of Office Action and 4 pages of English Translation.
Office Action Received for U.S. Appl. No. 12/242,311, mailed on Oct. 2, 2012, 16 pages.
Notice of Allowance Received for U.S. Appl. No. 11/731,810, mailed on Nov. 2, 2012, 10 pages.
Office Action Received for U.S. Appl. No. 12/887,325, mailed on Nov. 14, 2012, 7 pages.
Office Action Received for U.S. Appl. No. 12/887,325, mailed on Jan. 8, 2013, 12 pages.
Office Action Received for Chinese Patent Application No. 200980137745.X, mailed on Feb. 5, 2013, 5 Pages of Chinese Office Action and 5 Pages of English Translation.
Office Action Received for Taiwanese Patent Application No. 097111354, mailed on Aug. 12, 2011, 4 pages.

* cited by examiner

OPTICAL AND ELECTRICAL CONNECTOR

This application is a continuation of and claims the benefit of priority of U.S. patent application Ser. No. 13/758,271 filed Feb. 4, 2013, which is a continuation of U.S. patent application Ser. No. 11/731,810 filed Mar. 30, 2007, which issued on Mar. 19, 2013 as U.S. Pat. No. 8,398,314.

FIELD OF THE INVENTION

Embodiments of the invention relate to the universal serial bus and, more particularly, to a USB including having optical capabilities.

BACKGROUND INFORMATION

In many of today's processing systems, such as personal computer (PC) systems, there exist universal serial bus (USB) ports for connecting various USB devices. Some of these USB devices are frequently used by PC users. For example, these USB devices may be printers, compact disk read-only-memory (CD-ROM) drives, CD-ROM Writer (CDRW) drives, digital versatile disk (DVD) drives, cameras, pointing devices (e.g., computer mouse), keyboards, joy-sticks, hard-drives, speakers, etc. Some of these devices use more of the available USB bandwidth than others. For example, a USB CDRW is a high bandwidth device, while human interface devices (HID), such as computer mice, keyboards and joy-sticks, are low bandwidth devices.

Within a USB cable there are typically four shielded wires. Two of the wires may provide power (+5 volts (red) and ground (brown)) and a twisted pair (blue and yellow) for data.

At either end of a USB cable there is a standard sized connector. These connectors each has a different profile designated "A" connectors and "B" connectors. More recently, mini versions of these connectors are appearing to accommodate smaller devices. "A" connectors head "upstream" toward the computer. On the other end, "B" connectors head "downstream" and connect to individual devices. This way, it is almost fool proof to make a wrong connection.

The USB standard allows for low power devices (e.g., mice, memory sticks, keyboards, etc.) to draw their power from their USB connection. Larger devices requiring more power, such as scanners or printers, typically have their own dedicated power supply.

FIG. 1 shows a typical USB "A" male connector 10. The cable 12, comprises the above mentioned four wires and connects to a plastic housing 14. Each of the four wires electrically connects within the housing 14 to one of four contact terminals or pins 16 mounted on the top side of an insulative base 18. The insulative base 18 is wrapped in a metal shield 19. Openings 20 in the metal shield may be provided to lock the connector in place when plugged into a corresponding female connector.

FIG. 2 shows a more detailed view of the insulative base 18. As shown, conductive fasteners 21, 22, 23, and 24 are provided at one end to connect to each of the four wires in the cable 12. The outer two fasteners 21 and 22, are for power and the inner two connectors 23 and 24 are for data. On a top side of the insulative base 18 are four pins 31, 32, 33, and 34, corresponding to the contacts 21, 22, 23, and 24, respectively. The pins 31-34 within the male connector 10 electrically engage to mating pins within the female connector when plugged in.

Different standards of USB technology have different bandwidths. For instance, Universal Serial Bus Specification, revision 1.1, Sep. 23, 1998 (USB 1.1) devices are capable of operating at 12 Mbits/second (Mbps). Universal Serial Bus Specification, revision 2.0, Apr. 27, 2000 (USB 2.0; also known as high-speed USB) devices are capable of operating at 480 Mbps. However, as technology progresses engineers are constantly striving to increase operating speeds.

DETAILED DESCRIPTION

Embodiments of the invention are directed to an optical USB (called OUSB hereafter) to enhance the data rate of USB by adding super-high data rate (e.g. 10 Gbps) optical communication on top of its current specification so that backward compatibility is achievable.

A challenge with OUSB is the need to be backward compatible with the legacy USB form factor, which requires relatively large mechanical tolerances. That is, the mechanical tolerance specified by the USB connector is 0.3 mm. Optical connectors typically use a butt contact approach. However, optical butt contact may require 10 um precision or better. This makes the usual optical connector an unviable solution for USB form factor.

In order to resolve this issue, embodiments disclose an optical beam expanding approach. By expanding the beam size to, for example, 1 mm, the 0.3 mm mechanical tolerance required by the USB connector may be achieved.

Figure 2:
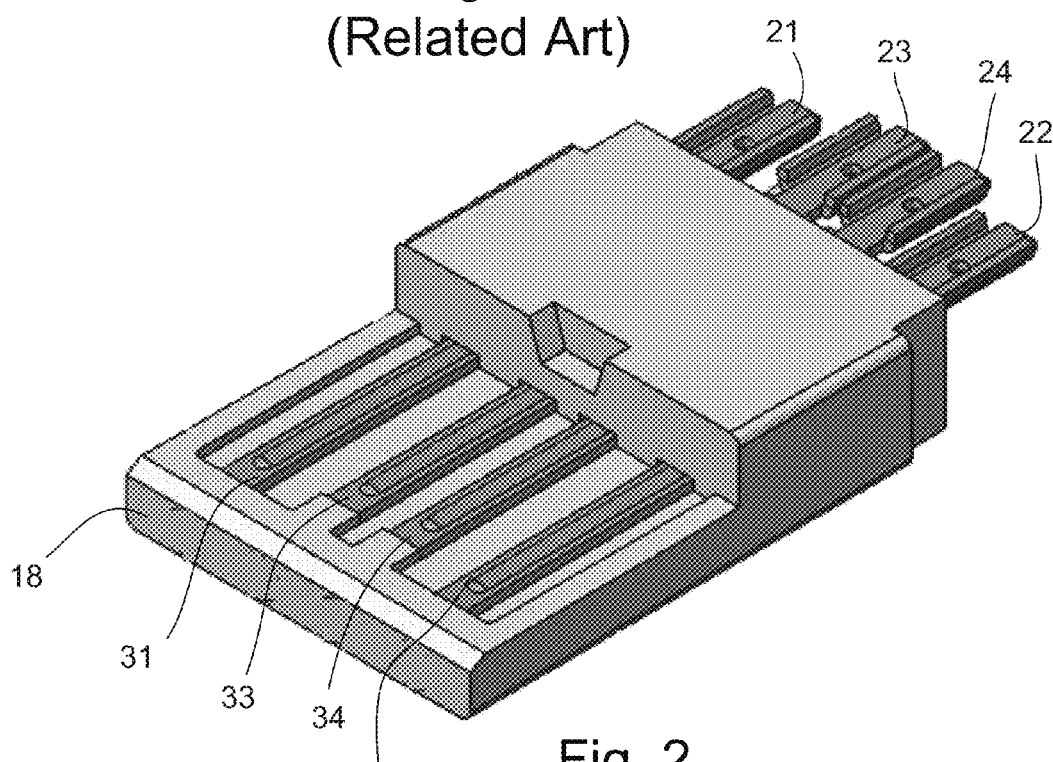
FIG. 2 is a block diagram showing a more detailed view of the insulative base of a USB "A" male connector.
Figure 3:
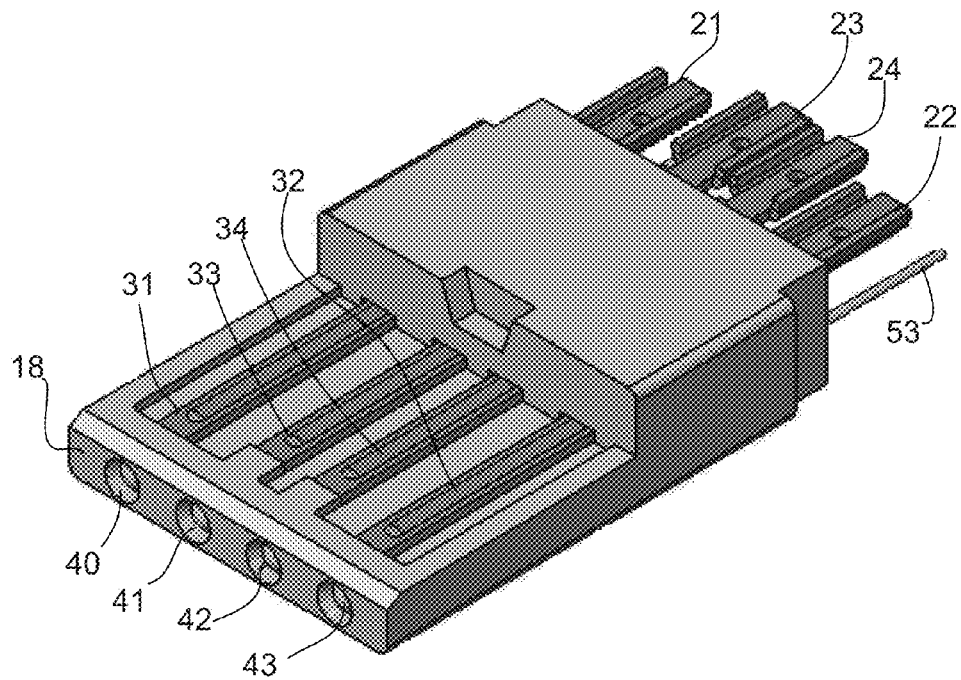
FIG. 3 is a top view of an insulative base of a USB "A" male connector according to embodiments of the invention.
Figure 4:
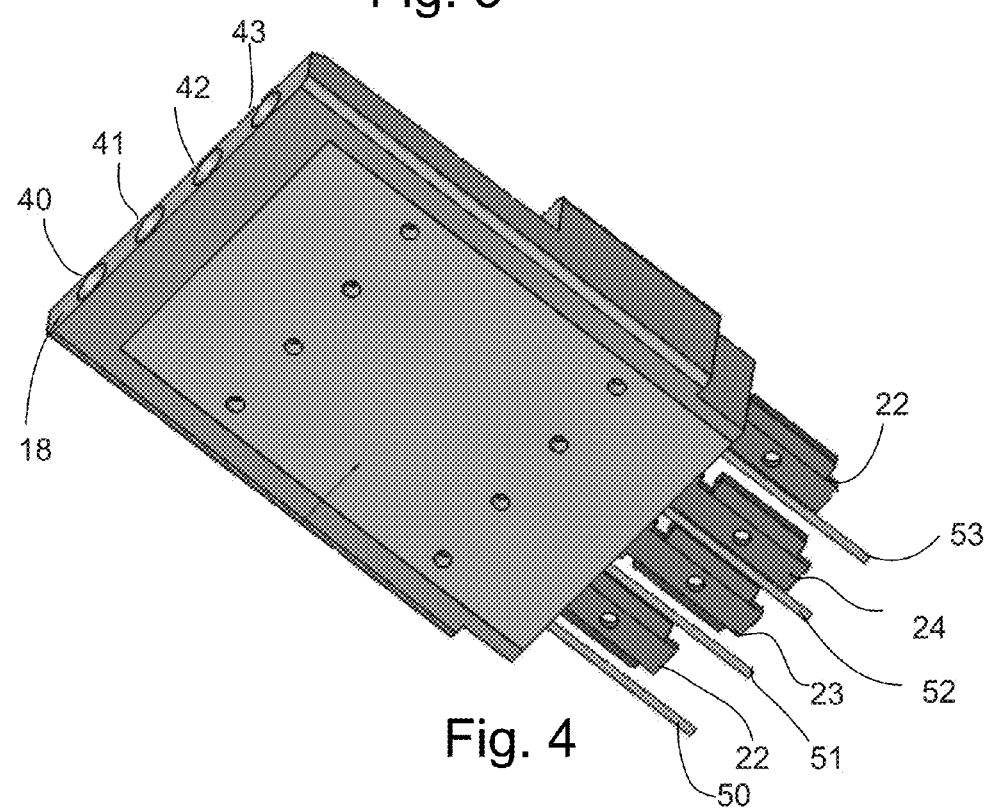
FIG. 4 is a bottom view of an insulative base of a USB "A" male connector according to embodiments of the invention.

Referring now to FIGS. 3 and 4, there is shown a top view and a bottom view, respectively, of the insulative base 18 of an OUSB connector according to one embodiment of the invention. Similar to that which is shown and described in FIG. 2, conductive fasteners 21, 22, 23, and 24 are provided at one end to connect to each of the four wires in the cable 12. The outer two fasteners 21 and 22, are for power and the inner two connectors 23 and 24 are for data. On a top side of the insulative base 18 are four pins 31, 32, 33, and 34, corresponding to the contacts 21, 22, 23, and 24, respectively. The pins 31-34 within the male connector 10 electrically engage to mating pins within the female connector when plugged in.

Figure 1:
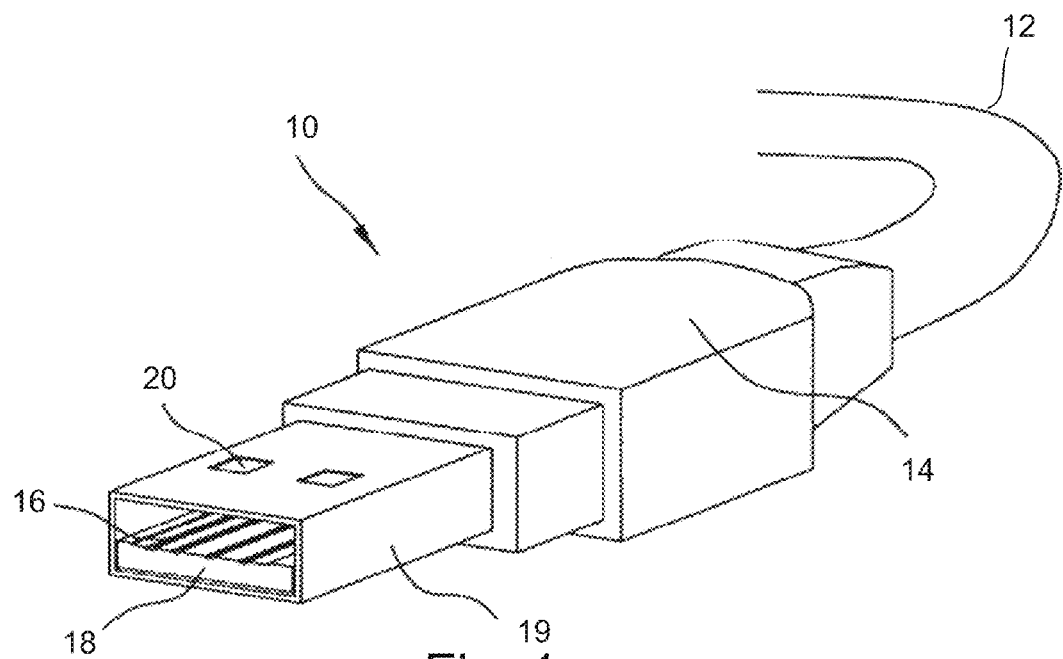
FIG. 1 is a block diagram showing a typical USB "A" male connector.

In addition, the OUSB connector comprises embedded lenses 40, 41, 42, and 43 on the leading edge of the insulative base 18. These lenses are optically coupled to respective fibers 50, 51, 52, and 53 for providing high speed optical data throughput. While four lenses are shown, this is by way of example and more or fewer may be provided. The lenses 40-43 may be within tapered holes as shown for fiber self-alignment in installation. The tapered holes may have metal inserts for added rigidity. While not shown in FIGS. 3 and 4, the insulative base 18 would be contained in a plastic housing 14 and include a metal shield 19 as shown in FIG. 1.

Figure 5:
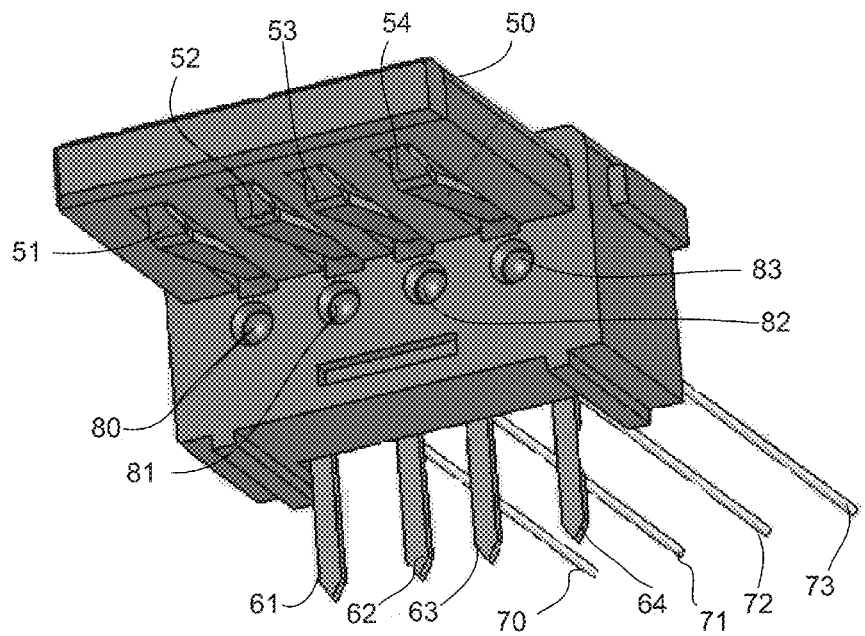
FIG. 5 is a block diagram of a female USB "A" connector according to embodiments of the invention.

FIG. 5 shows the inside of an "A" connector female OUSB configured to mate with the connector shown in FIGS. 3 and 4. As in standard USB, an insulative carrier 50 may comprise four contacts 51, 52, 53, and 54, which may be spring loaded, adapted to make electrical connection with pins 31, 32, 33, and 34, respectively, in the male connector. The four contacts 51, 52, 53, and 54 may be in turn electrically connected to a USB device with contact posts 61, 62, 63, and 64. Four fibers 70, 71, 72, and 73 may enter the female connector and be optically coupled to four embedded lenses 80, 81, 82, and 83, which, when connected, optically couple to the corresponding lenses 40-43 in the male connector.

Figure 6:
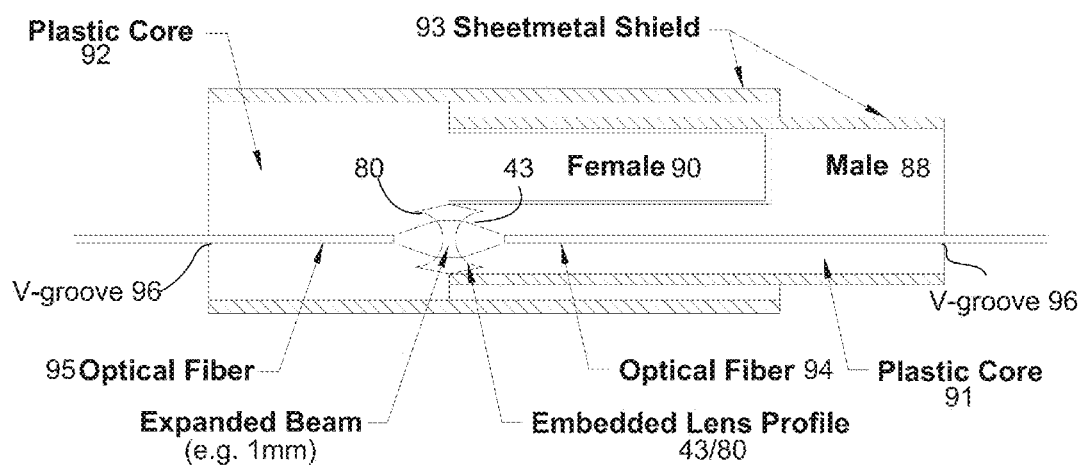
FIG. 6 is a cross sectional view of a mated USB "A" connector according to embodiments of the invention.

FIG. 6 shows a cut-away side view of a male OUSB connector 88 and female OUSB connector 90 when mated. For simplicity, the electrical connections are not shown in this figure, but may be present as shown in FIGS. 3-5. The male OUSB connector 88 comprises a plastic base or core 91. The female OUSB connecter also comprises a plastic core 92 each surrounded by its own metal shield 93. The plastic cores 91 and 92 may include V-grooves 96 to facilitate alignment of optical fibers 94 and 95.

After the plug (male) 90 and receptacle (female) 88 are mated, the lenses 43 and 80 are used to expanded the optical beam to facilitate optical communication. As illustrated, the optical beam from the fiber 94 from the male side may be expanded by lens 43 to, for example, approximately 1 mm. The expanded beam may then be collimated by the embedded lens 80 at the female side couple with fiber 95. Since the embedded lens profile 43 and 80 is identical at both sides, optical signals can go either direction. As one can see, expansion of the beam makes it possible to optically couple the fibers 94 and 95 since traditional butt coupling does not work well within the mechanical tolerance confines of USB connectors.

While the above embodiments have been illustrated as USB "A" connectors one skilled in the art will readily recognize that the invention described herein is equally applicable to USB "B" connectors or other USB form factors.

There are many advantages to OUSB. In particular, embodiments maintain all traditional USB electrical connections within the existing USB form factor. Thus, it is fully backward compatibility with the USB 2.0 specification. It allow super-high speed data rate (i.e. 10 Gbps) compared to the high speed of USB 2.0 (480 Mbps). In addition, optical signal integrity may be maintained in high EMI environments such as factories where traditional electrical connections may experience issues.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A universal serial bus (USB) connector, comprising:
    an insulative base wherein the insulative base has a first surface and a second surface wherein the first surface is perpendicular to the second surface;
    a plurality of electrical contacts on the first surface of the insulative base to make electrical connections with a mating universal serial bus (USB) connector, including at least one electrical contact to provide power and at least one electrical contact to make an electrical data connection;
    at least one lens in an opening in the second surface of the insulative base wherein the at least one lens is to convey an optical data signal received from a mating USB connector; and
    an optical fiber optically coupled to the at least one lens wherein the at least one lens is to expand and collimate a light beam from the optical fiber or is to focus a light beam into the optical fiber.

2. The universal serial bus (USB) connector of claim 1 wherein the USB connector comprises four lenses wherein the second surface comprises two openings and two lenses of the four lenses are located in each one of the two openings in the second surface and additionally four optical fibers wherein the four lenses are each optically coupled to a different one of the four optical fibers.

3. The universal serial bus (USB) connector of claim 1 wherein the plurality of electrical contacts on the first surface comprise two electrical contacts to provide power wherein a first electrical contact to provide power is to provide power and a second electrical contact to provide power is to provide a ground for power return.

4. The universal serial bus (USB) connector of claim 1 wherein the plurality of electrical contacts on the first surface comprise two electrical contacts to make electrical data connections wherein a first electrical contact is to act as a receiver and a second electrical contact is to act as a transmitter.

5. The universal serial bus (USB) connector of claim 1 wherein the at least one lens in an opening in the second surface of the insulative base has an exterior-facing surface and the exterior-facing surface of the at least one lens is recessed relative to the second surface of the insulative base.

6. The universal serial bus (USB) connector of claim 1 wherein the USB connector is a male connector and wherein the first surface comprises an interior surface of the male connector and the second surface comprises a exterior-facing surface of the male connector.

7. A universal serial bus (USB) connector, comprising:
    an insulative base wherein the insulative base has a first surface;
    a second surface wherein the second surface is perpendicular to the first surface;
    a plurality of electrical contacts on the first surface of the insulative base to make electrical connections with a mating universal serial bus (USB) connector, including at least one electrical contact to provide power and at least one electrical contact to make an electrical data connection;
    at least one lens in an opening in the second surface wherein the at least one lens is to convey an optical data signal received from a mating USB connector; and
    an optical fiber optically coupled to the at least one lens wherein the at least one lens is to expand and collimate a light beam from the optical fiber or is to focus a light beam into the optical fiber.

8. The universal serial bus (USB) connector of claim 7 wherein the USB connector comprises four lenses wherein the second surface comprises two openings and two lenses of the four lenses are located in each one of the two openings in the second surface and additionally four optical fibers wherein the four lenses are each optically coupled to a different one of the four optical fibers.

9. The universal serial bus (USB) connector of claim 7 wherein the plurality of electrical contacts on the first surface comprise two electrical contacts to provide power wherein a first electrical contact to provide power is to provide power and a second electrical contact to provide power is to provide a ground for power return.

10. The universal serial bus (USB) connector of claim 7 wherein the plurality of electrical contacts on the first surface comprise two electrical contacts to make electrical data connections wherein a first electrical contact is to act as a receiver and a second electrical contact is to act as a transmitter.

11. The universal serial bus (USB) connector of claim 7 wherein the at least one lens in an opening in the second surface of the insulative base has an exterior-facing surface and the exterior-facing surface of the at least one lens is recessed relative to the second surface of the insulative base.

12. The universal serial bus (USB) connector of claim 7 wherein the USB connector is a female connector and wherein the first surface comprises an interior surface of the female connector that is parallel to an insertion direction of a male connector and the second surface comprises an interior surface of the female connector that is perpendicular to the insertion direction of the male connector.

13. An optical and electrical connector, comprising:
an insulative base wherein the insulative base has a first surface and a second surface wherein the first surface is perpendicular to the second surface;
a plurality of electrical contacts on the first surface of the insulative base to make electrical connections with a mating connector, including at least one electrical contact to provide power and at least one electrical contact to make an electrical data connection;
at least one lens in an opening in the second surface of the insulative base wherein the at least one lens is to convey an optical data signal received from a mating connector; and
an optical fiber optically coupled to the at least one lens wherein the at least one lens is to expand and collimate a light beam from the optical fiber or is to focus a light beam into the optical fiber.

14. The optical and electrical connector of claim 13 wherein the connector comprises four lenses wherein the second surface comprises two openings and two lenses of the four lenses are located in each one of the two openings in the second surface and additionally four optical fibers wherein the four lenses are each optically coupled to a different one of the four optical fibers.

15. The optical and electrical connector of claim 13 wherein the plurality of electrical contacts on the first surface comprise two electrical contacts to provide power wherein a first electrical contact to provide power is to provide power and a second electrical contact to provide power is to provide a ground for power return.

16. The optical and electrical connector of claim 13 wherein the plurality of electrical contacts on the first surface comprise two electrical contacts to make electrical data connections wherein a first electrical contact is to act as a receiver and a second electrical contact is to act as a transmitter.

17. The optical and electrical connector of claim 13 wherein the at least one lens in an opening in the second surface of the insulative base has an exterior-facing surface and the exterior-facing surface of the at least one lens is recessed relative to the second surface of the insulative base.

18. The optical and electrical connector of claim 13 wherein the connector is a male connector and wherein the first surface comprises an interior surface of the male connector and the second surface comprises a exterior-facing surface of the male connector.

19. An optical and electrical connector, comprising:
an insulative base wherein the insulative base has a first surface;
a second surface wherein the second surface is perpendicular to the first surface;
a plurality of electrical contacts on the first surface of the insulative base to make electrical connections with a mating connector, including at least one electrical contact to provide power and at least one electrical contact to make an electrical data connection;
at least one lens in an opening in the second surface wherein the at least one lens is to convey an optical data signal received from a mating connector; and
an optical fiber optically coupled to the at least one lens wherein the at least one lens is to expand and collimate a light beam from the optical fiber or is to focus a light beam into the optical fiber.

20. The optical and electrical connector of claim 19 wherein the connector comprises four lenses wherein the second surface comprises two openings and two lenses of the four lenses are located in each one of the two openings in the second surface and additionally four optical fibers wherein the four lenses are each optically coupled to a different one of the four optical fibers.

21. The optical and electrical connector of claim 19 wherein the plurality of electrical contacts on the first surface comprise two electrical contacts to provide power wherein a first electrical contact to provide power is to provide power and a second electrical contact to provide power is to provide a ground for power return.

22. The optical and electrical connector of claim 19 wherein the plurality of electrical contacts on the first surface comprise two electrical contacts to make electrical data connections wherein a first electrical contact is to act as a receiver and a second electrical contact is to act as a transmitter.

23. The optical and electrical connector of claim 19 wherein the at least one lens in an opening in the second surface of the insulative base has an exterior-facing surface and the exterior-facing surface of the at least one lens is recessed relative to the second surface of the insulative base.

24. The optical and electrical connector of claim 19 wherein the connector is a female connector and wherein the first surface comprises an interior surface of the female connector that is parallel to an insertion direction of a male connector and the second surface comprises an interior surface of the female connector that is perpendicular to the insertion direction of the male connector.

\* \* \* \* \*